United States Patent Office 3,087,926
Patented Apr. 30, 1963

3,087,926
18-ACYLOXY-5-PREGNEN-3-OLS, DERIVATIVES, AND INTERMEDIATES FOR THEIR PREPARATION
Raphael Pappo, Skokie, Ill., assignor to G. D. Searle & Co., Chicago, Ill., a corporation of Delaware
No Drawing. Filed June 14, 1961, Ser. No. 116,930
5 Claims. (Cl. 260—239.55)

The present invention relates to a new group of 18-acyloxy-5-pregnen-3-ols, to their derivatives and 18,20-epoxides serving as intermediates for their synthesis. The 18-acyloxy-5-pregnenes of this invention can be represented by the structural formula

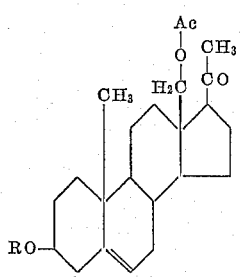

wherein R is hydrogen or an acyl radical and Ac is an acyl radical. The acyl radicals, which R and Ac can represent, are those derived from lower alkanoic acids, typically acetic, propionic, butyric, pentanoic, and hexanoic acid. These compounds are topical anesthetics and barbiturate potentiators. Specifically they prolong the sleeping time after administration of barbituric acid.

The foregoing 18-acyloxy compounds can be prepared from the corresponding 20-hydroxy-18,20-epoxy steroids by treatment with a lower alkanoic acid anhydride. Thus an epoxide of the formula

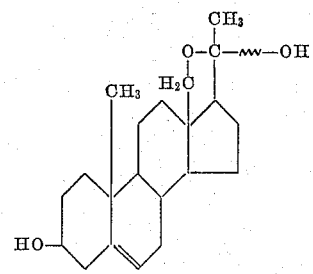

is mixed with acetic anhydride and on standing forms 3,18-diacetoxy-5-pregnen-20-one. The wavy line is used herein to designate that both the 20α- and 20β-configurations are present. The compounds, being ketals, epimerize readily at the 20 position. The epoxides of the last preceding structural formula likewise have the effect of prolonging sleeping time after barbiturate adminstration.

The compounds which constitute this invention and their preparation will appear more fully from a consideration of the following examples which were given for the purpose of illustration only and are not to be construed as limiting the invention in spirit or in scope. In these examples, quantities are indicated as parts by weight.

The present application is a continuation-in-part of copending application Serial No. 831,074, filed August 3, 1959, now abandoned.

Example 1

A solution of 0.78 part of p-toluenesulfonic acid monohydrate in 150 parts of chloroform is dried by azeotropic distillation. After about 75 parts of distillate have been collected, the solution is cooled and 1.35 parts of 18,20-epoxy-21-dimethylamino-5-pregnen-3β-ol (U.S. 2,907,758, Example 9) are added with stirring. Then 3 parts of dihydrofuran are added and the mixture is allowed to stand for 3 hours at room temperature. A large excess of dilute aqueous sodium hydroxide is stirred into the mixture. The chloroform layer is decanted, dried over anhydrous sodium sulfate, and evaporated to dryness. The 3β-(2-tetrahydropyranyloxy)-18,20-epoxy - 21 - dimethylamino-5(6)-pregnene does not show an absorption in the infrared spectrum in the range of 2.80 to 3.00 microns characteristic for an hydroxyl group. The compound has the structural formula

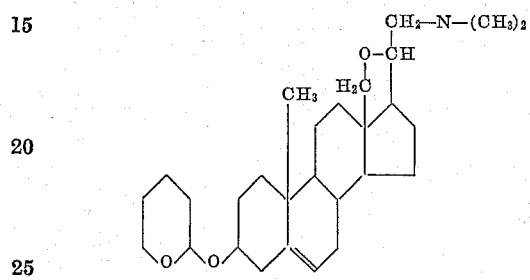

Example 2

To a solution of 1.289 parts of 3β-(2-tetrahydropyranyloxy)-18,20-epoxy-21-dimethylamino - 5(6) - pregnene and 9 parts of methanol is added 0.35 part of a 30% hydrogen peroxide solution. This mixture is allowed to stand for 24 hours at room temperature. Then 0.15 part of hydrogen peroxide is added and the mixture is allowed to stand for 48 hours. After decomposing the excess hydrogen peroxide by stirring the mixture for 5 hours with platinum dioxide, the mixture is centrifuged. The clear supernatant solution is concentrated to dryness under vacuum to yield the colorless gum of 3β-(2-tetrahydropyranyloxy)-18,20-epoxy - 21 - dimethylamino-5-pregnene N-oxide.

Example 3

The crude N-oxide obtained in the preceding example is suspended in tertiary butylbenzene. The solvent is distilled to dryness under vacuum at a temperature below 70° C. The crystalline residue is stirred with 60 parts of tertiary butylbenzene. Distillation at atmospheric pressure over a 30 minute period is carried on until 20 parts of the solvent have been removed. Distillation is then continued under vacuum to yield the crystalline residue of the crude 3β-(2-tetrahydropyranyloxy)-18,20-epoxy-5(6),20-pregnadiene. It has the structural formula

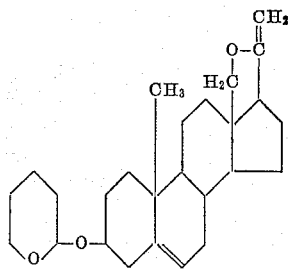

Example 4

The crude 3β-(2-tetrahydropyranyloxy)-18,20-epoxy-5,20-pregnadiene obtained in the preceding example is dissolved in 35 parts of dioxane. The solution is treated for 90 minutes at room temperature with 10 parts of 0.5-N hydrochloric acid. The solvent is removed under vacuum at room temperature and the remaining residue is stirred with benzene and water. The precipitate formed is filtered and air dried to yield the hydrate of 18,20-epoxy-5-pregnene-3β,20-diol. Upon drying under vacuum the compound is obtained as an amorphous gum. It has the structural formula

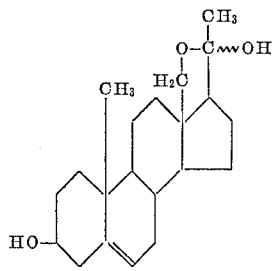

Infrared maxima for this compound are observed at 2.78, 3.40, 6.85, 7.21, 9.70 and 11.25 microns.

*Example 5*

To a solution of 1 part of the monohydrate of 18,20-epoxy-5-pregnene-3β,20-diol in 2 parts of pyridine is added 1 part of acetic anhydride and the mixture is allowed to stand for 8 hours at room temperature. After treating with water, the organic layer is extracted with a mixture of ether and benzene. The organic extract is washed with cold aqueous hydrochloric acid, aqueous sodium carbonate, and water. After drying over anhydrous sodium sulfate, the solution is evaporated to dryness. The remaining residue is recrystallized from benzene to yield a mixture of 20α- and 20β-hydroxy derivatives of 3β-acetoxy-18,20-epoxy-5-pregnen-20-ol melting at about 170°–176° with decomposition.

By substituting propionic anhydride for acetic anhydride in the above procedure, a mixture of the 20α- and 20β-hydroxy derivatives of 3β-propionoxy-18,20-epoxy-5-pregnen-20-ol is obtained.

*Example 6*

To a solution of 1 part of 18,20-epoxy-5-pregnene-3β,20-diol in 30 parts of pyridine are added 15 parts of acetic anhydride. The mixture is allowed to stand for 2 weeks at room temperature, diluted with cold water until turbid, allowed to stand at room temperature for 30 minutes, and extracted with ether. The extract is washed several times with cold hydrochloric acid and then with cold sodium hydroxide. After a final washing with water, the extract is dried over anhydrous sodium sulfate and the solvent is evaporated under an atmosphere of nitrogen. The remaining residue is dried under vacuum. The crude 3,18-diacetoxy-5-pregnen-20-one is subjected to chromatography using silica gel. The column is developed with solution of ether in benzene containing increasing concentrations of ether. Elution with a 30% ether solution and concentration of the eluate yields a crystalline material. This product is crystallized from 2-propanol to give 3,18-diacetoxy-5-pregnen-20-one melting at about 123–125° C. It has the structural formula

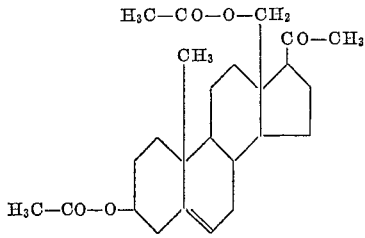

If propionic acid anhydride is used in place of the acetic acid anhydride, 3β,18-dipropionoxy-5-pregnen-20-one is obtained. Infrared maxima are observed for this compound at 5.80, 5.89 and 8.2 microns.

*Example 7*

To a solution of 1 part of 3β,18-diacetoxy-5-pregnen-20-one in 100 parts of absolute methanol is added 0.5 part of p-toluenesulfonic acid monohydrate. The mixture is allowed to stand for 24 hours, carefully neutralized with methanolic potassium carbonate, and concentrated under reduced pressure. The residue is dissolved in a mixture of ether and benzene, washed with water, and dried. Upon evaporation of the solvent, a gum is formed. This gum is chromatographed over acid washed alumina to yield 18-acetoxy-3β-hydroxy-5-pregnen-20-one. The compound has the structural formula

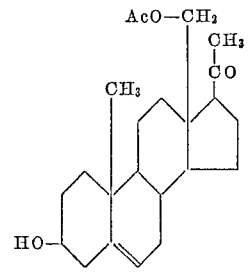

To a solution of 1 part of 18-acetoxy-3β-hydroxy-5-pregnen-20-one in 10 parts of pyridine are added 5 parts of propionic anhydride. The precipitate formed is collected on a filter and recrystallized to yield 18-acetoxy-3β-propionoxy-5-pregnen-20-one. The infrared absorption spectrum shows maxima at 5.75, 5.80, 5.89 and 8.15 microns.

*Example 8*

A mixture of 1 part of 18,20-epoxy-21-dimethylamino-5-pregnen-3β-ol, 10 parts of pyridine, and 5 parts of acetic anhydride is allowed to stand for 8 hours at room temperature and then cooled. After the addition of 5 parts of water, this solution is allowed to return to room temperature and then concentrated under reduced pressure. The residue is diluted with water and then partitioned between a mixture of ether and cold aqueous 5% sodium hydroxide. The ether layer is washed with water, dried, and evaporated to dryness to yield 3-acetoxy-18,20-epoxy-21-dimethylamino-5-pregnene melting at about 144–146° C.

By substituting 3β-acetoxy-18,20-epoxy-21-dimethylamino-5-pregnene for the 3β-(2-tetrahydropyranyloxy)-18,20-epoxy-21-dimethylamino-5-pregnene used in the procedure of Example 2, the amorphous gum of 3β-acetoxy-18,20-epoxy-21-dimethylamino-5-pregnene N - oxide is obtained.

This N-oxide is then substituted for the N-oxide of 3β-(2 - tetrahydropyranyloxy) - 18,20 - epoxy - 21 - dimethylamino-5-pregnene in the procedure of Example 3. Crystalline 3β-acetoxy-18,20-epoxy-5,20-pregnadiene is thus obtained. The crude 3β-acetoxy-18,20-epoxy-5,20-pregnadiene obtained is hydrolyzed according to the procedure described in Example 4 to yield 3β-acetoxy-18,20-epoxy-5-pregnen-20-ol, melting at about 171–176° C.

What is claimed is:

1. A compound of the structural formula

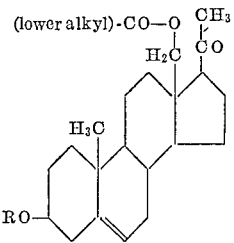

wherein R is a member of the class consisting of hydrogen and —CO(lower alkyl) radicals.

2. 3β,18-diacetoxy-5-pregnen-20-one.

3. A compound of the general structural formula
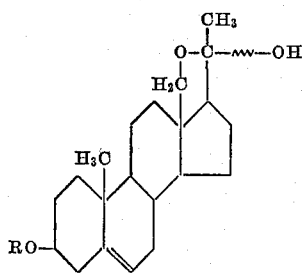
wherein R is a member of the class consisting of hydrogen and —CO-(lower alkyl).
4. 18,20-epoxy-5-pregnene-3β,20-diol.
5. 3β,acetoxy-18,20-epoxy-5-pregnen-20-ol.
References Cited in the file of this patent
Labler et al.: "Chemistry and Industry," May 9 (1959), page 599 relied on.